March 3, 1931.  S. SHAUL  1,794,422

FLOOD VALVE

Filed Nov. 7, 1929  2 Sheets-Sheet 1

S. Shaul Inventor

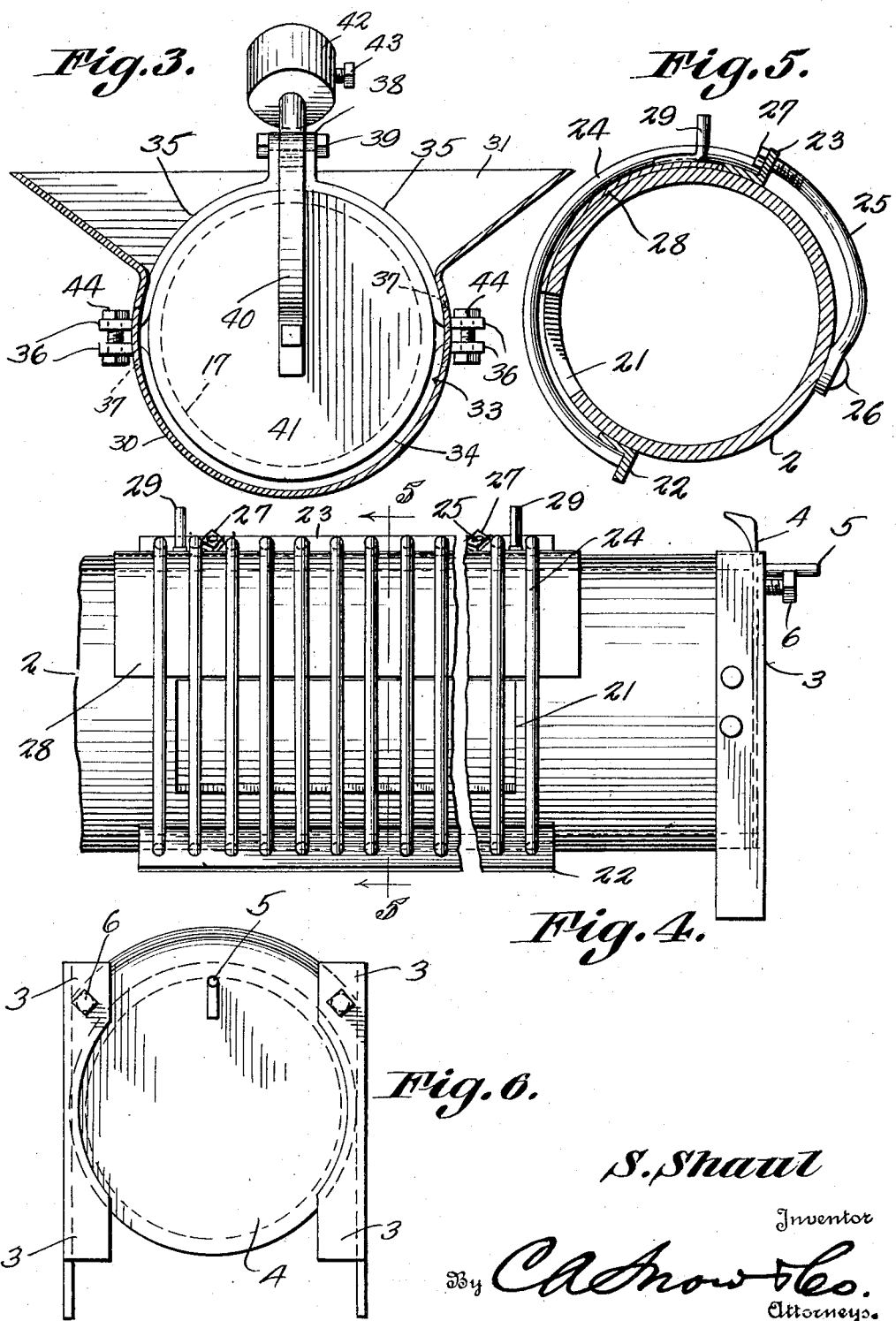

Patented Mar. 3, 1931

1,794,422

UNITED STATES PATENT OFFICE

SHERMAN SHAUL, OF WILLIAMSBURG, IOWA

FLOOD VALVE

Application filed November 7, 1929. Serial No. 405,455.

One object of this invention is to provide a novel valve adapted to be placed in the outfall line of a sewage system, to prevent water from backing up into the system, from a river or the like, in time of high water, it being possible, nevertheless, for the sewage to find its way into the river readily under normal conditions.

It is within the province of the disclosure to provide a novel means whereby the by-pass flow will be under the control of an operator.

A preferred form has been shown in the drawings, but it will be understood that a mechanic, working within the scope of what is claimed, may make such changes as his skill may suggest, without departing from the spirit of the invention.

In the accompanying drawings:

Figure 3 is a cross-section on the line 3—3 of Figure 2;

Figure 4 is an elevation showing the valve mechanism that is placed in the by-pass;

Figure 5 is a cross-section on the line 5—5 of Figure 4;

Figure 6 is an elevation of the device shown in Figure 4.

Figures 1, 2:
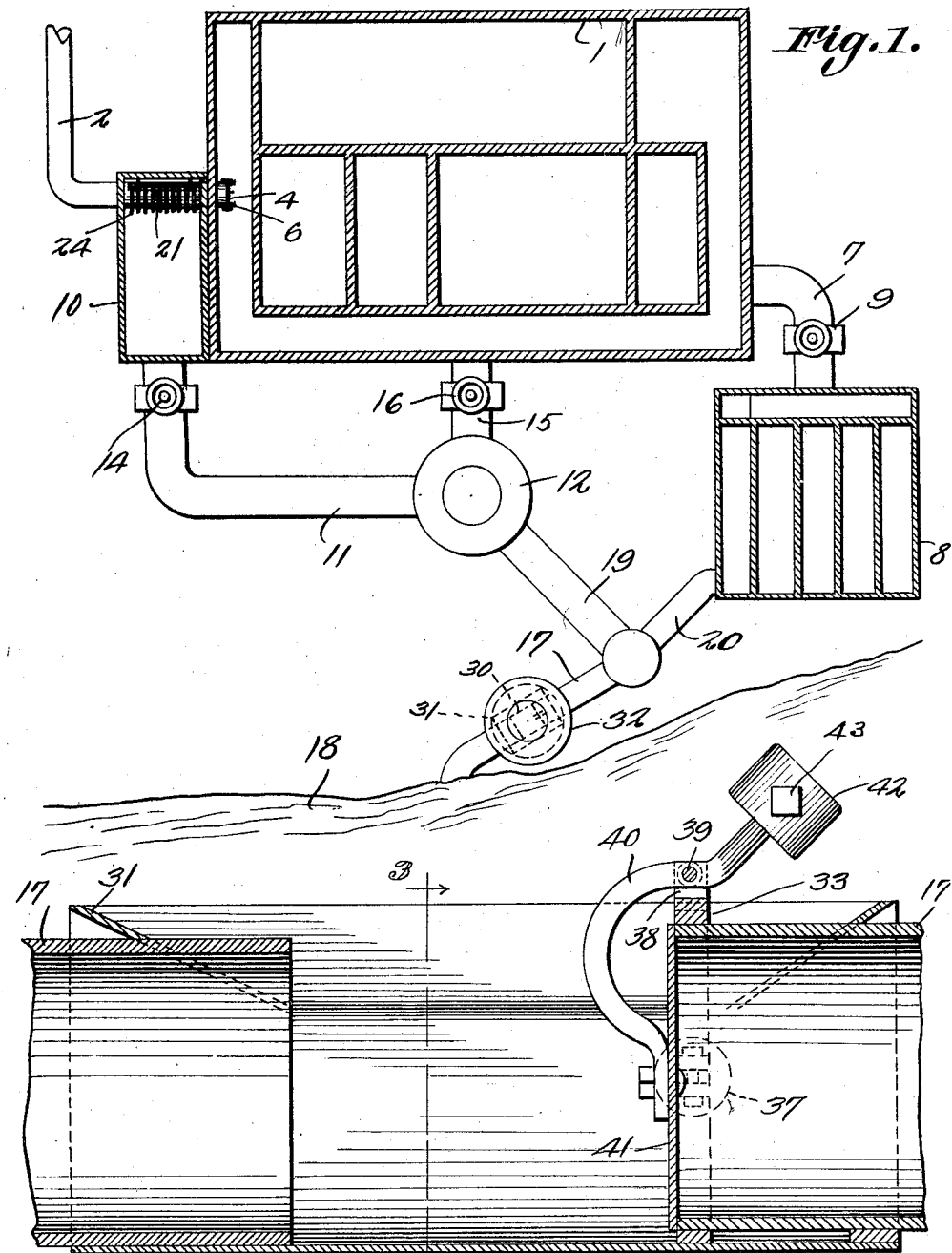
Figure 1 shows in plan, the devices forming the subject matter of this application installed in a sewerage system.
Figure 2 is a sectional view showing the back-pressure valve and attendant parts.

The numeral 1 designates a sewerage disposal plant, to which the sewage is supplied through an inlet pipe 2. At the inner end of the pipe 2, there are vertical guides 3 in which a gate 4 is adjustable. The gate 4 has a handle 5 by which it may be moved to and from closed position. Set screws 6 are threaded into the guides 3 and engage the gate 4 to hold it in any position to which it may have been adjusted. A pipe 7 leads from the sewage disposal plan 1 to a filter 8. There is a valve 9 or other suitable means by which the flow through the pipe 7 may be controlled. A supplemental tank 10, forming part of the by-pass system, is located at one end of the sewage disposal plant 1. A pipe 11 leads from the tank 10 to a cess pool 12, and there is a valve 14 in the pipe 11. A pipe 15 connects the sewage disposal plant 1 with the cess pool 12, and in the pipe 15, there is a valve 16, the valves 16, 14, and 9 being under the control of an operator.

The outfall line of the system is marked by the numeral 17, and leads to a river 18 or other body of water which takes care of the sewage ultimately. The outfall pipe 17 has a branch 19 communicating with the cess pool 12, and has a branch 20 communicating with the filter 8.

In the inlet pipe 2 is an opening 21 which communicates with the supplemental tank 10. An anchor 22, such as an angle member, is secured to the pipe 2 within the tank 10. A foot-piece 23, in the form of an angle member, is mounted on the pipe 2 and extends lengthwise of the pipe 2 in parallel relation to the anchor 22. The anchor 22 and the foot-piece 23 are disposed on opposite sides of the opening 21 in the pipe 2. Grate bars 24 connect the foot-piece 23 and the anchor 22. Tie rods 25 extend circumferentially of the inlet pipe 2. At their outer ends, the tie rods 25 are connected at 26 to the pipe 2. The inner ends of the tie rods 25 pass through the foot-piece 23. Nuts 27 are threaded on the tie rods 25 and bear against the foot-piece 23. Owing to the adjustment thus provided, the grate bars may be spaced a proper distance from the pipe 2, so as to retain a curved gate 28, in the form of a plate, for sliding movement.

The gate 28 has outstanding handles 29 which extend between the grate bars 24 and hold the gate 28 in place. The grate bars 24 bind the gate 28 frictionally against the pipe 2, under the action of the nuts 27, but it is possible to shift the gate 28 by means of the handles 29, so that the gate covers the opening 21 more or less.

A tubular metal base 30 is provided and is connected to a hopper 31 which may support a manhole 32, indicated in Figure 1.

The numeral 33 designates an annular supporting frame made up of a bottom member 34 which is approximately semi-circular in form, as Figure 3 will show. The supporting frame 33 includes a top member 35 which, also, is approximately semi-circular in form. The members 34 and 35 have ears 36 that extend outwardly through openings in the tubular base 30. The ears 36 are joined by tightening devices, such as bolts 44, and through the instrumentality of the bolts 44, the frame 33 may be clamped on one end of the pipe 17, the said end of the pipe 17 entering the trough-shaped base 30. The opposite portion of the pipe 17 is extended into the base 30, and into the hub 31, as shown in Figure 2.

The top member 35 of the frame 33 has projections 38 in which is mounted a pivot element 39. A curved arm 40 is mounted intermediate its ends to swing on the pivot element 39 between the projections 38. On the upper end of the arm 40 there is a weight 42 which may be adjusted lengthwise of the arm, the weight being held in adjusted positions by a set screw 43 which is threaded into the weight 42 and engages the arm 40. On the lower end of the arm 40 there is secured a valve plate 41 which bears against one end of the pipe 17 and closes toward the filter 8, that is, away from the river 18. The weight 42 may be so adjusted on the arm 40 that the plate 41 will not bear with much pressure against the end of the pipe 17.

In the ordinary operation of the device, the sewage can push the valve 41 open and escape through the pipe 17 into the river 18.

If, however, the water in the river rises unduly, the valve 41 will be held closed, and the water will be prevented from backing up into the sewer system.

The gate 4 is set to regulate the amount of sewage that goes into the disposal plant 1, and the pipe 2 may be closed entirely by the gate 4, if desired. The sewage then travels through the by-pass represented by the supplemental tank 10, the pipe 11, and the pipe 19, into the pipe 17, and from thence into the river 18.

The amount of liquid that flows through the opening 21 in the pipe 2 into the tank 10 may be regulated by shifting the gate 28. The solid matter is held back by the grate bars 24 and passes on into the disposal plant 1, to be handled in the usual way.

What is claimed is:

1. In a device of the class described, a base having openings, a pipe extended into the base, a frame comprising cooperating members having ears extended outwardly through the openings, connecting devices joining the ears and located externally of the base, the connecting devices holding the frame on the pipe, an arm pivoted to the frame, and a valve carried by the arm and cooperating with the end of the pipe.

2. In a device of the class described, a base having openings, a pipe extended into the base, a frame arranged about the pipe and comprising cooperating members having ears extended outwardly through the openings, connecting devices joining the ears and holding the frame on the pipe, an arm pivotally mounted intermediate its ends on the frame, a valve carried by one end of the arm and cooperating with the pipe, and a counterpoise weight on the opposite end of the arm.

In testimony that I claim the foregoing as my own, I have hereto affixed my signature.

SHERMAN SHAUL.